Figure 11:
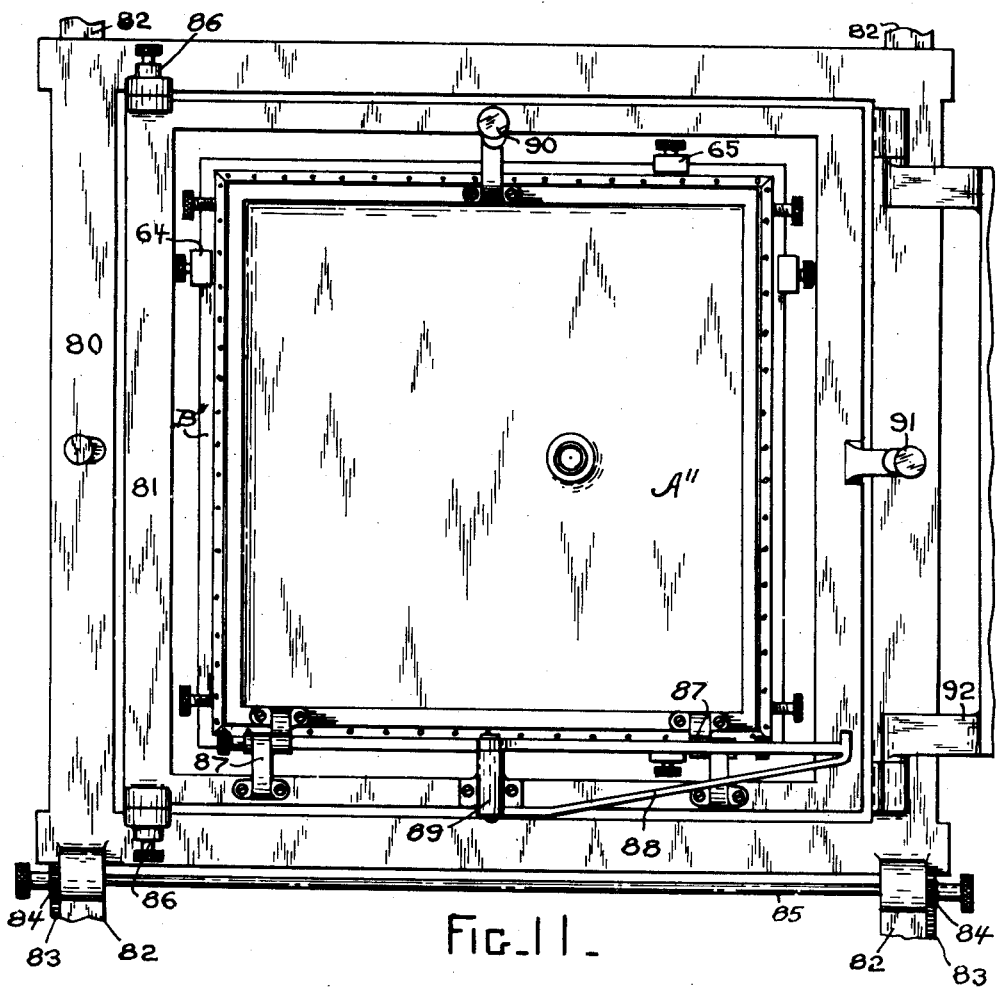

Oct. 18, 1938.   W. C. HUEBNER   2,133,518
VACUUM HOLDER
Filed Aug. 20, 1937   6 Sheets-Sheet 1
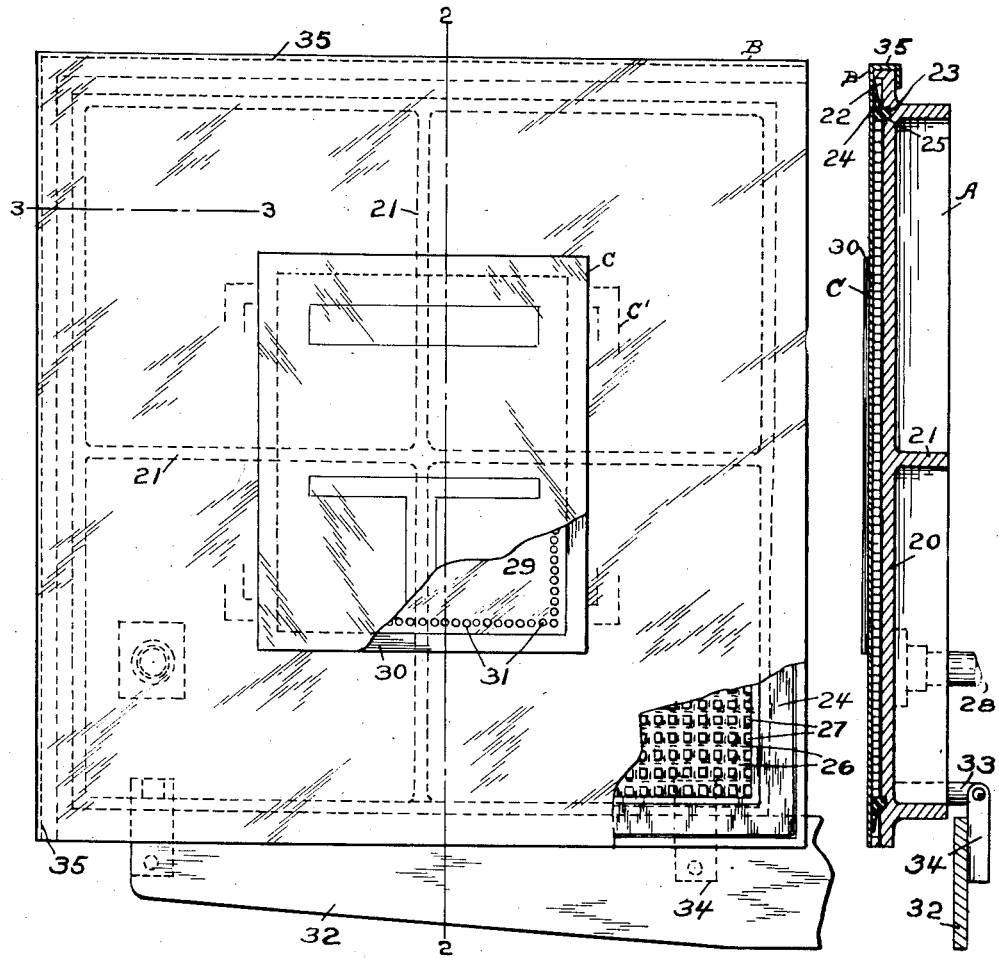
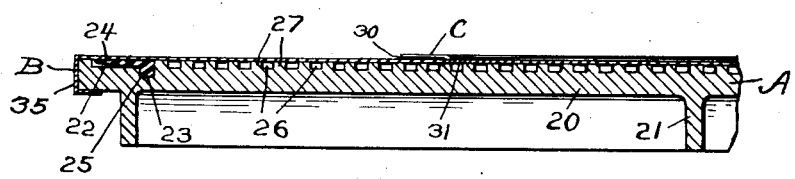
INVENTOR
William C. Huebner
BY Joseph Harris
ATTORNEY Oct. 18, 1938. W. C. HUEBNER 2,133,518
VACUUM HOLDER
Filed Aug. 20, 1937 6 Sheets-Sheet 2
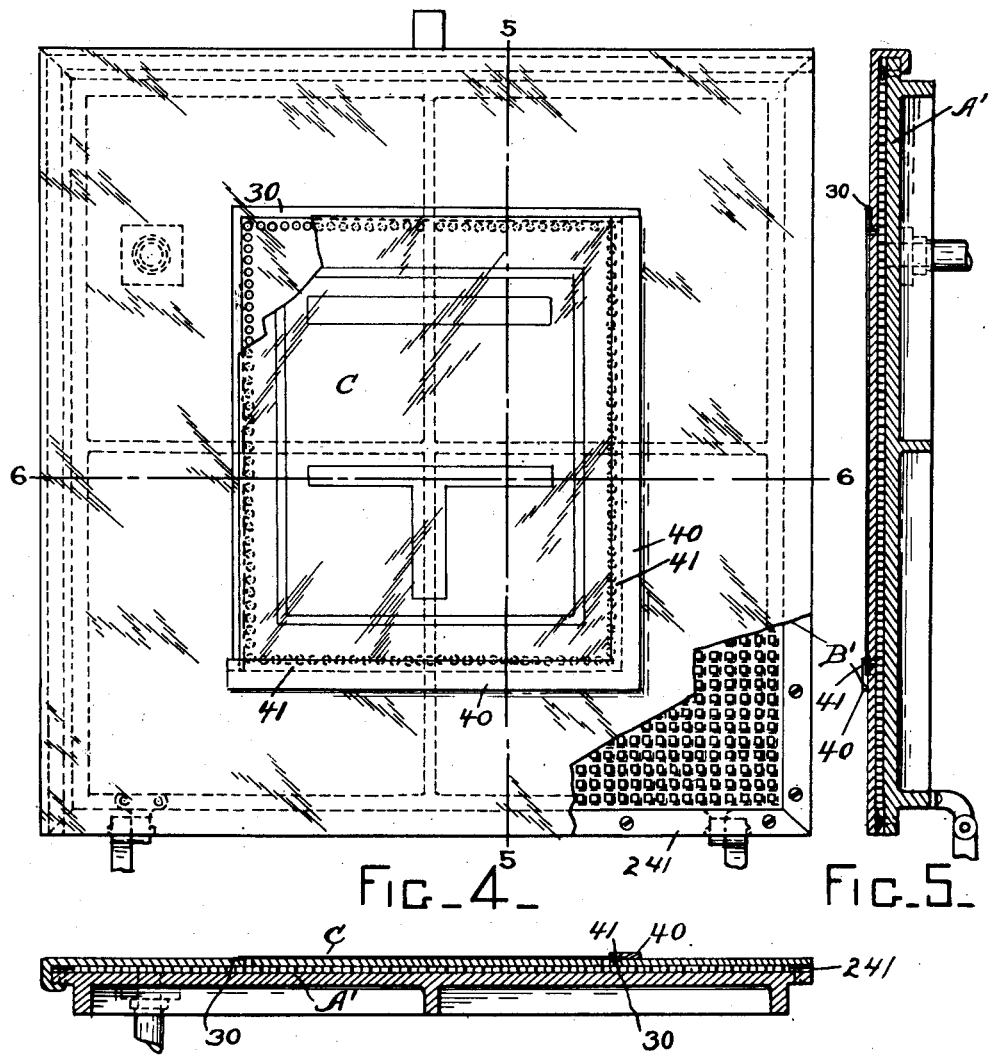
Fig_4_   Fig_5_
Fig_6_
INVENTOR
William C. Huebner
By Joseph Harris
ATTORNEY

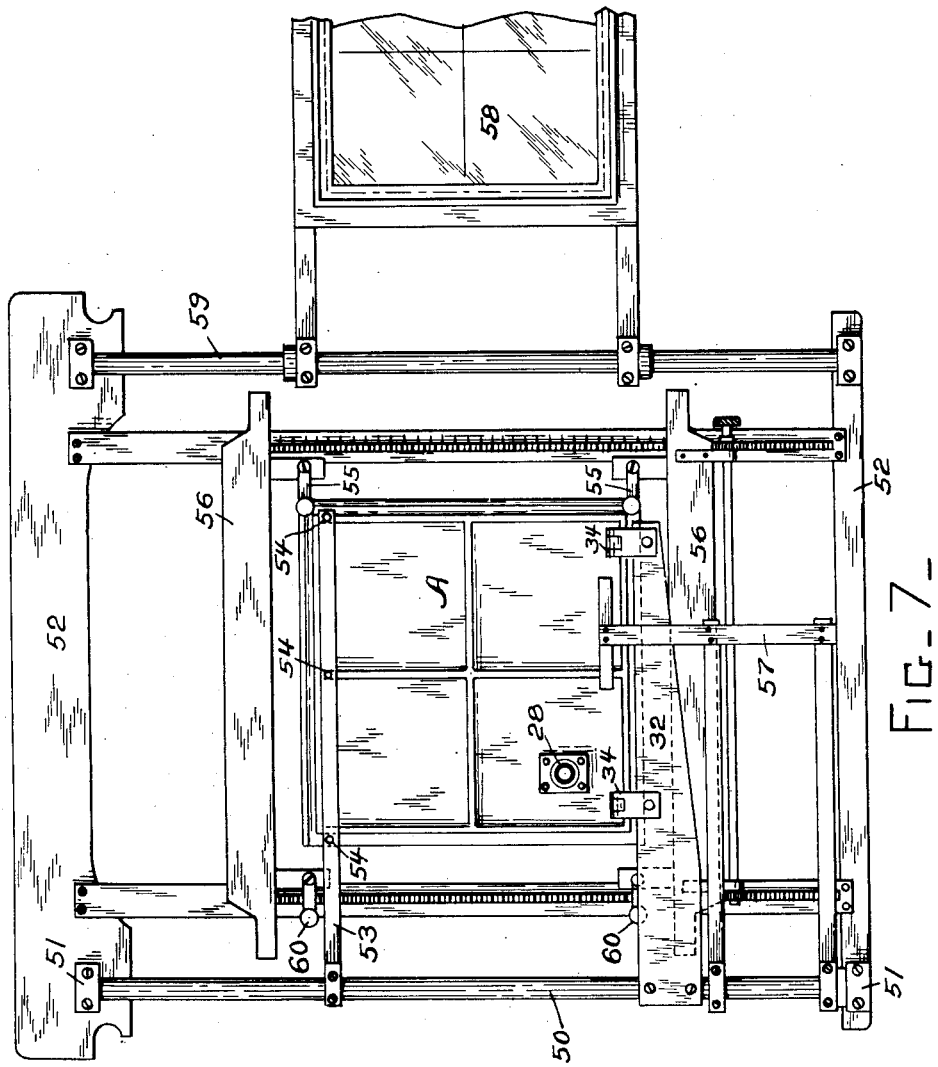

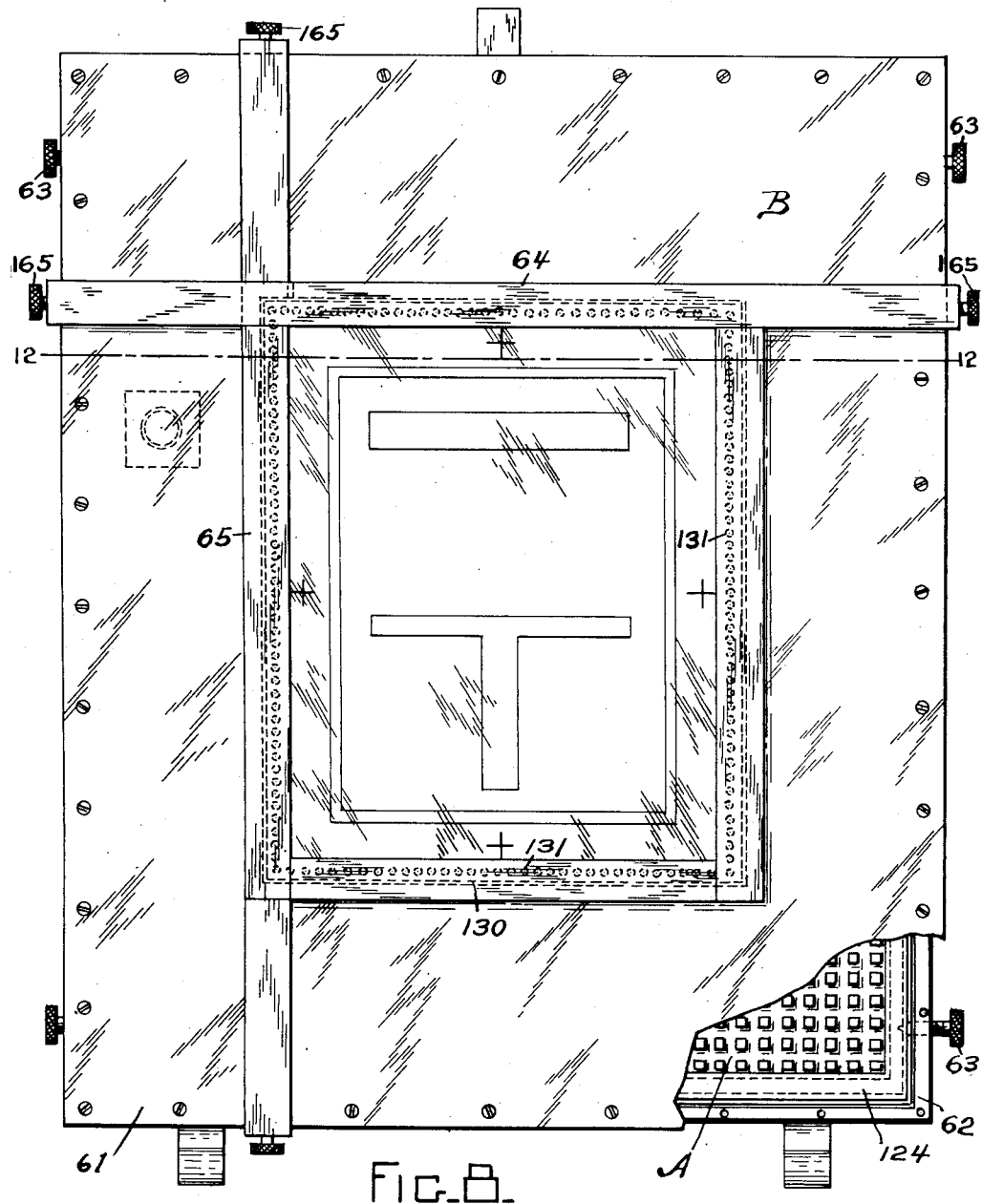

Oct. 18, 1938. W. C. HUEBNER 2,133,518
VACUUM HOLDER
Filed Aug. 20, 1937 6 Sheets-Sheet 5
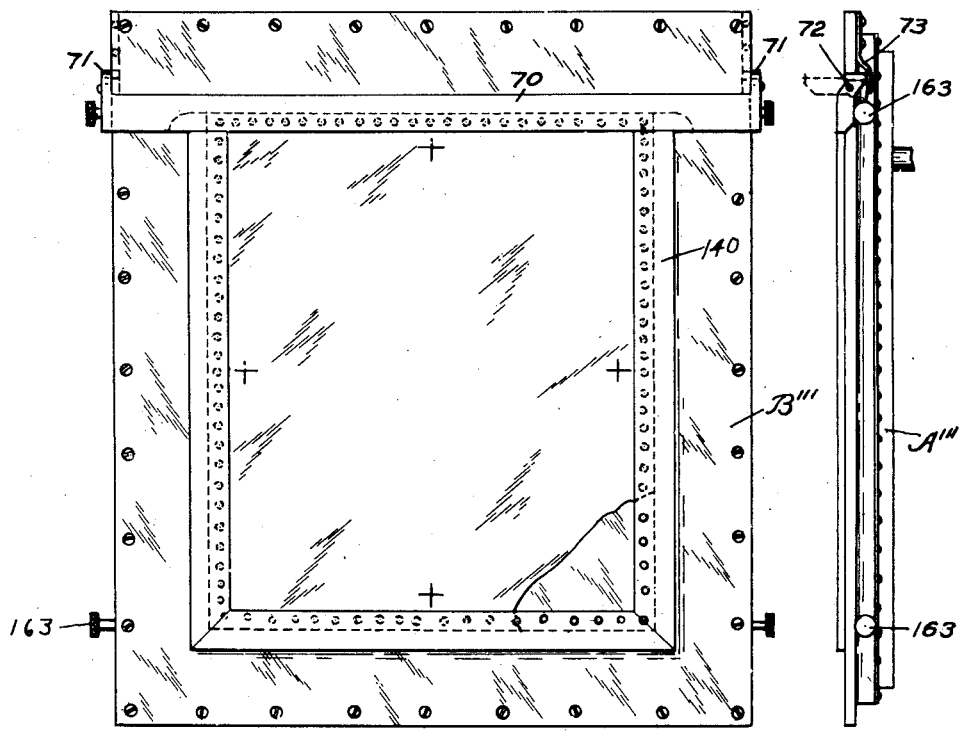
FIG_9_ FIG_10_
INVENTOR
William C. Huebner
BY Joseph Harris
ATTORNEY Oct. 18, 1938.   W. C. HUEBNER   2,133,518
VACUUM HOLDER
Filed Aug. 20, 1937   6 Sheets-Sheet 6

INVENTOR
William C. Huebner
BY Joseph Harris
ATTORNEY

Patented Oct. 18, 1938

2,133,518

UNITED STATES PATENT OFFICE 2,133,518

VACUUM HOLDER

William C. Huebner, New York, N. Y.

Application August 20, 1937, Serial No. 160,095

5 Claims. (Cl. 248—363)

This invention relates to improvements in vacuum holder and more particularly, but not exclusively, vacuum holders for photographically sensitized film, paper, metal plates, semi-flexible plates, rigid glass plates and the like, during exposure in process cameras.

One object of this invention is to provide a vacuum holder of the type hereinbefore indicated, such that, regardless of the size of the element being held thereon, there will always be substantially the same working load on the vacuum creating apparatus, thus insuring uniform vacuum pressure at all times and, in turn, eliminating danger of indentation of film, paper or other like materials being held.

Another object of the invention is to provide a vacuum holder of the type indicated such that the same may be changed or converted, in a few seconds, so as to hold elements of any size, from the smallest to the largest within the capacity of the holder, the construction being further characterized by the fact that the changes may be made with equal facility in either a lighted or dark room.

Another object of the invention is to provide a vacuum holder of the type indicated which comprises, broadly, a main backing member and a series of detachable and interchangeable masks cooperable with the backing member, the masks being so designed that any one thereof, having the selected size hold-down area for the particular sensitized or other element to be held, may be readily assembled with the backing member and the holder thereby immediately adapted to hold such element.

Further objects of the invention are: to provide a vacuum holding arrangement comprising a vacuum backing member with which is cooperable any one of a series of masks wherein the masks have different size hold-down areas, the backing member being provided with air sealing means cooperable with the several masks and each mask having an air sealing gasket surrounding its particular hold-down area whereby the volume of the space from which the air is exhausted remains constant regardless of the size of the hold-down area for the sensitized element; to provide simple means whereby the operator may readily center the sensitized element on the mask of the vacuum holder even though working in the dark; to provide means particularly adapted for holding down curly paper and film.

Other objects of the invention will more clearly appear from the description and claims hereinafter following.

Figure 12:
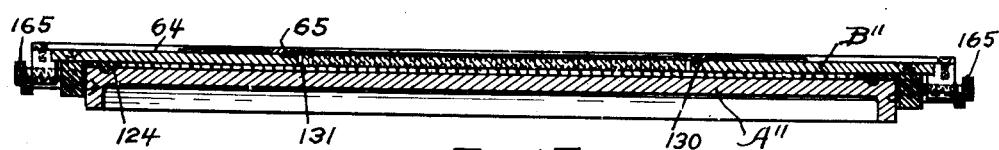
Figure 13:
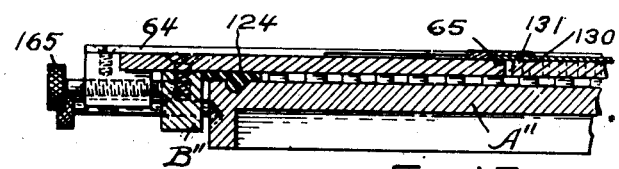

In the drawings forming a part of this specification, Figure 1 is an elevational view of a vacuum holder emoodying the invention, a corner portion of the mask being broken out to better illustrate the details of construction of the backing member and a corner portion of the film mounted on the holder being also broken out to illustrate certain details of construction of the mask. Figure 2 is a vertical sectional view corresponding substantially to the line 2—2 of Figure 1. Figure 3 is a broken, transverse sectional view, upon an enlarged scale, corresponding substantially to the line 3—3 of Figure 1. Figure 4 is a view similar to Figure 1 but illustrating a somewhat modified form of mask. Figure 5 is a vertical sectional view corresponding to the section line 5—5 of Figure 4. Figure 6 is a transverse sectional view corresponding to the line 6—6 of Figure 4. Figure 7 is an elevational view showing the improved vacuum holding arrangement incorporated in a process camera and its relation to the focus plate thereof. Figures 8 and 9 are views similar to Figure 1 illustrating still other modifications of the vacuum holder. Figure 10 is an edge elevational view of the holder shown in Figure 9. Figure 11 is an elevational view showing more particularly a vacuum holder of the type illustrated in Figure 8, mounted in a special supporting arrangement in a camera. Figure 12 is a transverse sectional view corresponding substantially to the line 12—12 of Figure 8. And Figure 13 is a broken detail sectional view, similar to Figure 12, but upon an enlarged scale.

Referring first to the construction illustrated in Figures 1, 2 and 3, A indicates broadly the vacuum backing member; B, one of a series of detachable and interchangeable masks; and C a piece of film in position on the vacuum holder.

The backing member A, as shown, is rigid and, preferably, will be in the form of as light a casting as suitable for the work to be done, such as aluminum. The backing member A will also preferably be of square configuration with a main web 20 suitably braced by integral ribs 21—21 on the back side thereof. The outer surface of the main web 20 constitutes the work area of the backing member and said work area is of special formation, as hereinafter described. Around all edges of the main web 20 of the backing member on the working side thereof, is preferably provided a relatively shallow and wide channel 22 having, along its inner edge, a deepened recess 23. Positioned within the channeled recess 22—23, and extending all around the periphery of the backing member, is a flexible and preferably rubber air sealing gasket 24, the latter having a rib section 25 seating within the deepened recess 23, as best shown in Figure 3. The main or flat portion of the sealing gasket 24 normally partly occupies and partly extends outside of the channel 22 so as to insure engagement with the mask B, when the latter is applied to the backing member, as hereinafter described.

The work area of the backing member which is the entire space within the sealing gasket 24 is, in general, flat or planar but, at the same time, provided with a series of intercommunicating, relatively shallow, air channels 26—26. In actual practice, the air channels 26 may be conveniently and relatively inexpensively formed by milling the surface of the backing member with a series of cuts extending parallel to one edge and another series at right angles thereto, thus leaving a myriad of knobs or supporting projections 27—27 over the entire work area.

At any suitable point within the work area of the backing member A, an air exhaust passage is provided, as by means of the pipe indicated at 28 and which passage is obviously in communication with all of the intercommunicating air channels 26 hereinbefore referred to. As will be understood, the exhaust pipe 28 is adapted to be connected to a suitable source of vacuum such as a vacuum pump with a suitable control valve in the line for turning on and shutting off the vacuum.

The mask B may be composed of any suitable material and, preferably, of relatively light gauge and inherently flexible sheet metal. Said mask B will be made substantially coextensive in area with the over-all area of the backing member A, that is, square in the particular form illustrated in Figure 1. An essential consideration in the mask B is that the same be of sufficient area to engage with the sealing gasket 24 of the backing member around the entire work area of the backing member A.

Within the area outlined by the sealing gasket 24, the mask B is provided with what may be termed a hold-down area, as indicated at 29. Said hold-down area 29, as shown, is of rectangular outline and centrally located and is surrounded by and defined by another air sealing gasket 30 cemented or otherwise suitably secured to the outer face of the mask B. The hold-down area 29 is perforated, preferably by a series of holes 31—31 just inside of and extending all along the inner edge of the sealing gasket 30. The sealing gasket 30, as best shown in Figure 3, is preferably made of a relatively thin layer of rubber so as to avoid undue projection or elevation above the main plane of the mask, but at the same time being readily perceptible to touch so that the outer edges thereof serve as guide edges for the operator when locating a section of film C on the hold-down area and while working in the dark or semi-darkness. By confining the perforations 31 to lines adjacent the sealing gasket 30, it is evident that the remainder of the mask sheet within said perforations 31 is imperforate and hence indentation of a sensitized film within the image or printing area thereof, is thus positively prevented when placed under vacuum. The remainder of the mask sheet outside of the sealing gasket 30 thereof, is imperforate, as shown.

In Figures 1 and 2, the vacuum holder is shown pivotally attached to a supporting bar 32 of a process camera as by means of the hinge lugs 33 and 34. When the vacuum holder is used in conjunction with a process camera, it will ordinarily be maintained in a vertical position, and particularly when exposures are being made. To facilitate the attaching and detaching of the mask B to the backing member A, and more particularly when working in the dark room end of the camera, simple means are provided for attaching the mask to the member A. Said means, as shown, preferably comprise a channeled flange 35 along at least one edge of the mask and preferably along two adjacent edges thereof, for the purpose hereinafter described. As will be understood, the mask is simply hung on the member B and supported by the channeled flange 35, as best shown in Figure 2.

Provision of the second channeled flange 35 along an adjacent edge is to permit the mask B to be hung from the top edge of the member A in either of two positions at 90° to each other. As will be evident, this permits of a film or other sensitized element of given rectangular formation as shown, being positioned with its greater length extending vertically or horizontally as indicated by the dotted lines C' in Figure 1.

As hereinbefore indicated, a series of similar masks B will be employed, each differing from the other only with respect to the size of the hold-down area. Said sizes, in commercial practice, may vary from as small as 5" x 7" to 24" x 24" or even larger, dependent upon the maximum capacity of the vacuum holder. As hereinbefore indicated, all of the hold-down areas of the series of masks B are centered thereon so that when any one of the masks B is mounted on the backing member A, the center of the hold-down area will always occupy the same position relative to the backing member A, this being true whether the mask is turned 90°, as indicated at C and C' in Figure 1. Hence, when the backing member A is once properly positioned in the process camera with the center thereof in line with the axis of the camera lens, the centers of the hold-down areas of the masks, regardless of the size of the hold-down areas, will always fall in line with the lens axis.

In employing the invention, the mask having the hold-down area of desired size in accordance with the particular piece of film, paper or the like which is to be used, is mounted on the backing member A in contact with the sealing gasket 24 thereof. The operator then positions the film or other element C over the hold-down area, accurate centering or positioning being readily obtained even in darkness, by a sense of touch when engaging the sealing gasket 30 of the mask. Since, as hereinbefore pointed out, the centers of the hold-down areas are in the line of the camera lens axis, it is evident that the center of each film or other element C when properly centered by means of the sealing gasket 30 as just described, will also be in the line of the camera lens axis and hence the operator is assured that the projected image will be in the center of the film and within that area which lies within the series of perforations 31 and hence not subject to indentation when the vacuum is on. When the element C has been properly positioned over the hold-down area, the operator then turns on the vacuum operating through the vacuum pipe 28, whereupon the air will be exhausted from the space between the mask and backing member which is sealed off by the gasket 24. Simultaneously, as will be obvious, the air is exhausted from beneath the film or other element C and the latter air sealed to the mask B through the sealing gasket 30.

Many practical advantages inhere in the construction so far described. As will be apparent to those skilled in the art, element C of any size within the range of the holder may be centered and held down by vacuum, change from the hold-down area of one size to a hold-down area of a different size being readily effected in a few seconds of time. As will further be evident, regardless of the size of the element C which is being held down by vacuum, the volume of the space from which the air is exhausted remains substantially constant. This in turn implies that, for a vacuum pump of given capacity, the degree of vacuum exerted on the paper, film or other element C being held down, will always be substantially the same. It will thus be seen that for any particular vacuum holder, the most desirable working vacuum pressure having once been ascertained, the proper size vacuum pump can then be employed, thereby insuring maximum efficiency for that vacuum holder regardless of the hold-down area of any of the masks being employed at any time. The improved vacuum holder herein described also insures that there will be no excessive vacuum pressure created on any film, paper or other element C which is being held down since, as hereinbefore indicated, the vacuum pressure will remain substantially constant at all times and under all conditions.

As will be apparent from the description and drawings, the mask B, although flexible, is supported in a flat plane throughout its entire area by reason of the multiplicity of supporting knobs 27. Correspondingly, any element C is maintained flat throughout its area since the hold-down area of the mask, regardless of the size of the hold-down area, is always maintained in a flat plane.

As will be obvious to those skilled in the art, the improved vacuum holder eliminates the time wasting procedure of taping down film or paper negatives with adhesive tape, as heretofore customary and, on account of the construction of the mask and its hold-down area, there is a minimum wastage of paper or film outside of the area in which the image is to be photographically reproduced.

In the preceding description and the drawing relating thereto, reference has been made to the use of a rubber sealing gasket 24 between the mask and the backing member. In some instances, however, a rubber sealing gasket need not be employed, since it has been found that, by using a mask of sheet material of suitable flexibility and a smooth metal surface on the backing member with which the mask may make good contact, a sufficient seal may be obtained to create a vacuum beneath the mask. However, the use of a sealing gasket, such as shown or similar thereto, is preferred and will ordinarily be employed.

Referring next to the construction illustrated in Figures 4, 5 and 6, the arrangement there shown is substantially the same as that shown in Figures 1, 2 and 3. The mask B', however, is provided along two edges of the hold-down area thereof, with fixed positioning guides 40—40 which have shallow flanges 41 along their inner edges overhanging and slightly spaced from the sealing gasket 30 of the mask. With the positioning guides 40, the film or paper C may be inserted with two of its edges beneath the guides and thereby positively centered or located, as will be evident.

The backing member A', of the construction shown in Figures 4, 5 and 6, differs slightly from the backing member A of the first described form, in that the channel formation 22, 23 of the latter is omitted and, instead, rubber sealing strips 241 are secured around the edges of the backing member by screws, as indicated. Said sealing strips may obviously be secured by cementing instead of by screws.

In Figure 7, the vacuum holder is there shown mounted in a process camera. The backing member A of the holder is pivotally attached to the supporting bar 32 in the manner heretofore described in connection with Figures 1 and 2. The supporting bar 32 is attached to a vertical pivot shaft 50 suitably journaled in bearings 51—51 carried by upper and lower horizontal members 52—52 of the camera. As will be evident, the holder may be swung out from focus position about the axis of the shaft 50 and may also be swung down to horizontal position about the hinges 34—34 hereinbefore referred to. The holder is normally held vertically by means of a retainer bar 53 which is supported from the shaft 50 and detachably connected to the backing member A as by the pins 54. To lock the holder in focus position in the camera, pivoted button latches 55 may be employed, the latter being pivotally attached to cross bars 56—56 and adapted to be swung behind the holder to retain the free edge thereof, as will be apparent.

To support the free edge of the holder when it is swung down horizontally, a supporting brace 57 may be employed, the same being attached to the shaft 50 as shown.

A focus plate 58 is shown, the same being mounted on a vertical shaft 59 on the opposite side of the camera, thus allowing the focus plate to be swung to focus position in line with the axis of the lens, when the vacuum holder is swung out of focus position. The focus plate 58 may be held in focus position by a second set of pivoted button latches 60—60.

Referring to the modification shown in Figure 8, the vacuum backing member A'' there shown is the same as heretofore described in connection with Figure 1. The mask B'', however, is somewhat different in that the metal sheet 61 is secured, around its edges to a rigidifying rim 62. The rim 62 is of such size that it will telescope over the edges of the backing member A'' and is adapted to be secured to the latter by the adjustable screws 63—63, it being understood that the sheet element of the mask will engage with the gasket 124 of the backing member A''. With this form of mask, adjustable guide bars 64 and 65 may be employed, one extending horizontally and the other vertically so as to locate and define two sides of the hold-down area, the remaining two sides being defined by fixed guides similar to those referenced 40—41 in Figures 4, 5 and 6. Each of said bars 64 has flanged ends through which are threaded adjustable clamping screws 165—165 so that the guide bars may be held in any desired position relative to the mask. The mask is provided with an arrangement of sealing gasket 130 and vacuum holes 131—131 similar to that described in connection with the Figure 1 form of the invention.

Referring to the modification shown in Figures 9 and 10, the general arrangement of backing member A''' and mask B''' is similar to that described in connection with Figure 8, that is, the mask is formed with a rigid frame adapted to be positioned over the backing member and secured thereto by the screws 163—163. The mask B'''' is provided around three edges of the hold-down area, with fixed guides 140 similar to those described in connection with Figures 4, 5 and 6. Along the fourth edge of the hold-down area, the mask B'''' is provided with a pivoted hold-down bar 70, the latter having lugs 71 at its ends pivoted to the mask frame, as indicated at 72. Said bar 70 is adapted to be retained in either the full line position shown in Figures 9 and 10, or the dotted line position shown in Figure 10, by means of a spring 73, as shown.

The arrangement of Figures 9 and 10 is particularly advantageous when inherently curly paper or film is being used. Such paper or film may be inserted beneath the fixed guides and then the fourth edge held down by the bar 70, thus enabling the operator to smooth out the paper or film over the hold-down area to insure removal of all wrinkles when the suction is applied. The bar may then be swung back to inoperative position during exposure, as will be apparent.

In the construction shown in Figures 11, 12 and 13, the backing member, mask and guide bars are or may be the same as those described in connection with Figure 8 as indicated respectfully at A'', B'', 64 and 65. The holder, however, is shown in connection with a specialized supporting arrangement for a process camera, said supporting arrangement including a main frame 80 and sub-frame 81. Said main frame 80, of rectangular outline, is vertically adjustable on guide bars 82—82 of the camera by means of racks 83—83 and pinions 84—84, the latter being carried by a shaft 85 journaled in bearing lugs at the bottom of the frame 80.

The sub-frame 81 is pivotally connected to the main frame 80 as by the hinges 86—86 so as to swing about a vertical axis and to one side of the main frame 80. The backing member A'' of the holder is in turn pivotally connected to the sub-frame 81 as by the hinges indicated at 87—87 so as to swing about a horizontal axis and thus allow the vacuum holder to be swung down to horizontal position. In the latter position, it may be supported by a brace 88 pivotally attached to the sub-frame 81, as indicated at 89. When in focus position, the vacuum holder is held by a pivoted button 90 at the top carried by the sub-frame 81 and the latter in turn is held in the main frame 80 by another button 91. A portion of the focus glass frame is indicated at 92, the same being pivotally attached to the main frame 80 on the opposite side to that at which the sub-frame 81 is attached, said focus glass frame being swingable to focus position when the vacuum holder is swung out of place, as will be apparent.

Although there has herein been shown and described what is now considered the preferred manner of carrying out the invention, the same is merely illustrative and not by way of limitation. All changes and modifications are contemplated that come within the scope of the claims appended hereto.

What is claimed is:

1. In a vacuum holding device, the combination with a flat backing member; of a mask separate and detachable from and substantially coextensive in area with the backing member; means providing an air seal between the mask and the backing member around their peripheries when the mask is positioned over the backing member; means by which air may be exhausted from the space between the mask and backing member which is sealed off by said air sealing means, said mask having a work hold-down area thereof located within and of lesser area than the area outlined by said air sealing means and which work hold-down area is perforated to allow air being exhausted therethrough when said space is being exhausted whereby, articles of lesser area than could be vacuum held directly and solely by said backing member may be vacuum held on and by said lesser size work hold-down area of said mask when vacuum is produced between the backing member and mask while the latter is cooperatively assembled with the backing member.

2. As an article of manufacture, a relatively flat mask for a vacuum holder of the character described, said mask, on one side thereof, having a relatively thin air-sealing gasket secured thereto, said gasket surrounding and defining a hold-down area of predetermined extent less than the overall area of the mask, said hold-down area being provided with a plurality of perforations therearound located inside of and relatively closely adjacent said sealing gasket, the remainder of the hold-down area within said perforations and the area outside of the sealing gasket, being imperforate.

3. As an article of manufacture, a relatively flat mask for a vacuum holder, said mask having a substantially centrally located hold-down area of lesser extent than the overall area of the mask, said hold-down area being provided with a plurality of perforations therearound, the mask, both inside and outside of said perforations being imperforate.

4. In vacuum holding means wherein a vacuum backing member of a given hold-down area may be positioned in line with the axis of the lens of a process camera and utilized in conjunction with interchangeable masks for holding films of different sizes including those of lesser area than the hold-down area of the backing member itself, a mask of substantially the same over-all area as that of the backing member and adapted to be detachably positioned over and air-sealed with the backing member around the hold-down area of the latter, said mask having an apertured hold-down area located within the confines of the periphery thereof and of lesser area than the hold-down area of the backing member, said mask being interchangeable with other masks of similar character, but having different sized hold-down areas.

5. In vacuum holding means wherein a vacuum backing member of a given hold-down area may be positioned in line with the axis of the lens of a process camera and utilized in conjunction with interchangeable masks for holding films of different sizes including those of lesser area than the hold-down area of the backing member itself, a mask of substantially the same overall area as that of the backing member and adapted to be detachably positioned over and air-sealed with the backing member around the hold-down area of the latter, said mask having an air-sealing gasket on the outer surface thereof surrounding and defining a hold-down area of the mask centrally located within and of lesser area than the sealed-off area between the backing member and mask, said hold-down area of the mask being perforated within the gasket and, inside of the perforations and outside of said air-sealing gasket being imperforate.

WILLIAM C. HUEBNER.